United States Patent [19]

Yokomizo

[11] Patent Number: 4,667,237

[45] Date of Patent: May 19, 1987

[54] IMAGE SIGNAL PROCESSING DEVICE

[75] Inventor: Yoshikazu Yokomizo, Kawagoe, Japan

[73] Assignee: Canon Kabushiki Kaisha, Tokyo, Japan

[21] Appl. No.: 491,797

[22] Filed: May 5, 1983

[30] Foreign Application Priority Data

May 12, 1982 [JP] Japan ................................. 57-78181
May 12, 1982 [JP] Japan ................................. 57-78182

[51] Int. Cl.$^4$ .............................................. H04N 5/14
[52] U.S. Cl. ...................................... 358/160; 358/282
[58] Field of Search ............... 358/160, 282, 156, 170, 358/163, 166, 167, 168, 280, 284; 382/52, 53, 50

[56] References Cited

U.S. PATENT DOCUMENTS 3,723,649 3/1973 Pitegoff et al. ..................... 358/282
4,187,519 2/1980 Vitols et al. ......................... 358/160
4,345,314 8/1982 Malamud et al. ................... 358/282
4,446,486 5/1984 Itoth ..................................... 382/53

FOREIGN PATENT DOCUMENTS 0074266 6/1980 Japan ................................. 358/167
0182373 10/1983 Japan ................................. 358/160

OTHER PUBLICATIONS

Penny, "Dynamic Threshold Setting Circuit", IBM Technical Disclosure Bulletin, vol. 18, No. 6, 11/75, pp. 1962-1965.

Primary Examiner—Tommy P. Chin
Assistant Examiner—David E. Harvey
Attorney, Agent, or Firm—Fitzpatrick, Cella, Harper & Scinto

[57] ABSTRACT

A binary digitizing apparatus in which the white and the black levels of the input signals are measured for determining a reference value, and thus determined reference value is used for binary digitizing the input signals.

14 Claims, 8 Drawing Figures

IMAGE SIGNAL PROCESSING DEVICE

BACKGROUND OF THE INVENTION

1. Field of the Invention

The present invention relates to an image signal processing device for example for converting input image signals into binary signals.

2. Description of the Prior Art

In image processing apparatus such as facsimile, it is already known to handle image signals in the form of binary signals indicating white and black levels.

There are already proposed various binary digitizing circuits for image signals, as exemplified in FIG. 1.

In the conventional circuit shown in FIG. 1, image signals obtained from unrepresented image taking means such as a CCD linear sensor are supplied, in addition to a comparator circuit 1, to an envelope detector 2 in which the envelope of white level is detected by a half-wave rectifier with a suitable time constant.

The obtained envelope output signal is divided in a voltage-dividing circuit 3, and, after the addition of an offset voltage in a DC voltage adder circuit 4 in order to avoid noise in the black area, is supplied as a reference voltage to the comparator circuit 1 for binary digitizing of the aforementioned image signals.

In the above-described conventional circuit the envelope detector 2 has a function as a peak-hold circuit for the white level, and such circuit is known to be associated with the drawback that the quality of the image formed by such binary signals is delicately affected by the selection of the discharge time constant of said peak-hold circuit. Also in FIG. 1 it is assumed that the black level of the original document corresponds to the ground potential, and there will be required a circuit for clamping the black level to the ground potential. Also the binary digitizing of image signals representing white characters on a black background cannot be effected satisfactorily because of the simple addition of the offset voltage by the DC voltage adder circuit 4.

Also in a circuit in which the slicing level for binary digitizing is determined in response to the image signals, the presence of noises in the image signals may affect the slicing level, thus disturbing normal digitizing operation.

SUMMARY OF THE INVENTION

An object of the present invention is to provide an image signal processing device capable of accurate binary digitizing of image signals without the drawbacks in the conventional systems.

Another object of the present invention is to provide a device capable of efficiently binary digitizing the image signals without adjustment by means of a digital processing circuit for binary digitizing.

Still another object of the present invention is to provide an image signal processing circuit capable of exact binary digitizing through the use of a black-level peak-hold circuit for responding to the change in the black level, in addition to the conventional envelope detector or the like for responding to the change of the white level alone.

Still another object of the present invention is to provide a device capable of exact binary digitizing of image signals obtained from low-density originals such as those written with pencils or from white characters on a black background.

Still another object of the present invention is to provide an image signal processing device capable of avoiding undesirable effects resulting from noise or the like contained in image signals corresponding to a continuous white or black area.

The foregoing and still other objects of the present invention will become fully apparent from the following description.

DETAILED DESCRIPTION OF THE PREFERRED EMBODIMENTS

Now the present invention will be explained in detail by the following description relative to certain embodiments thereof shown in the attached drawings.

Figure 1:
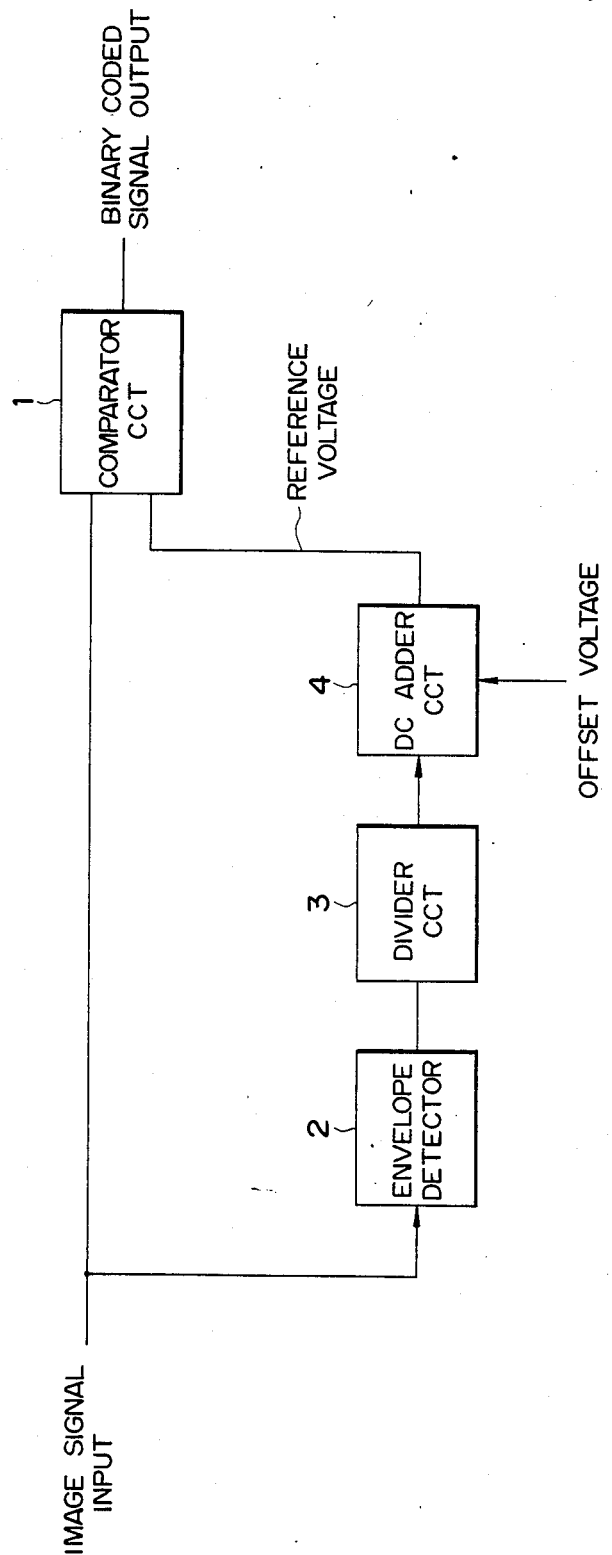
FIG. 1 is a block diagram showing a conventional example of a binary digitizing circuit for image signals.
Figure 2:
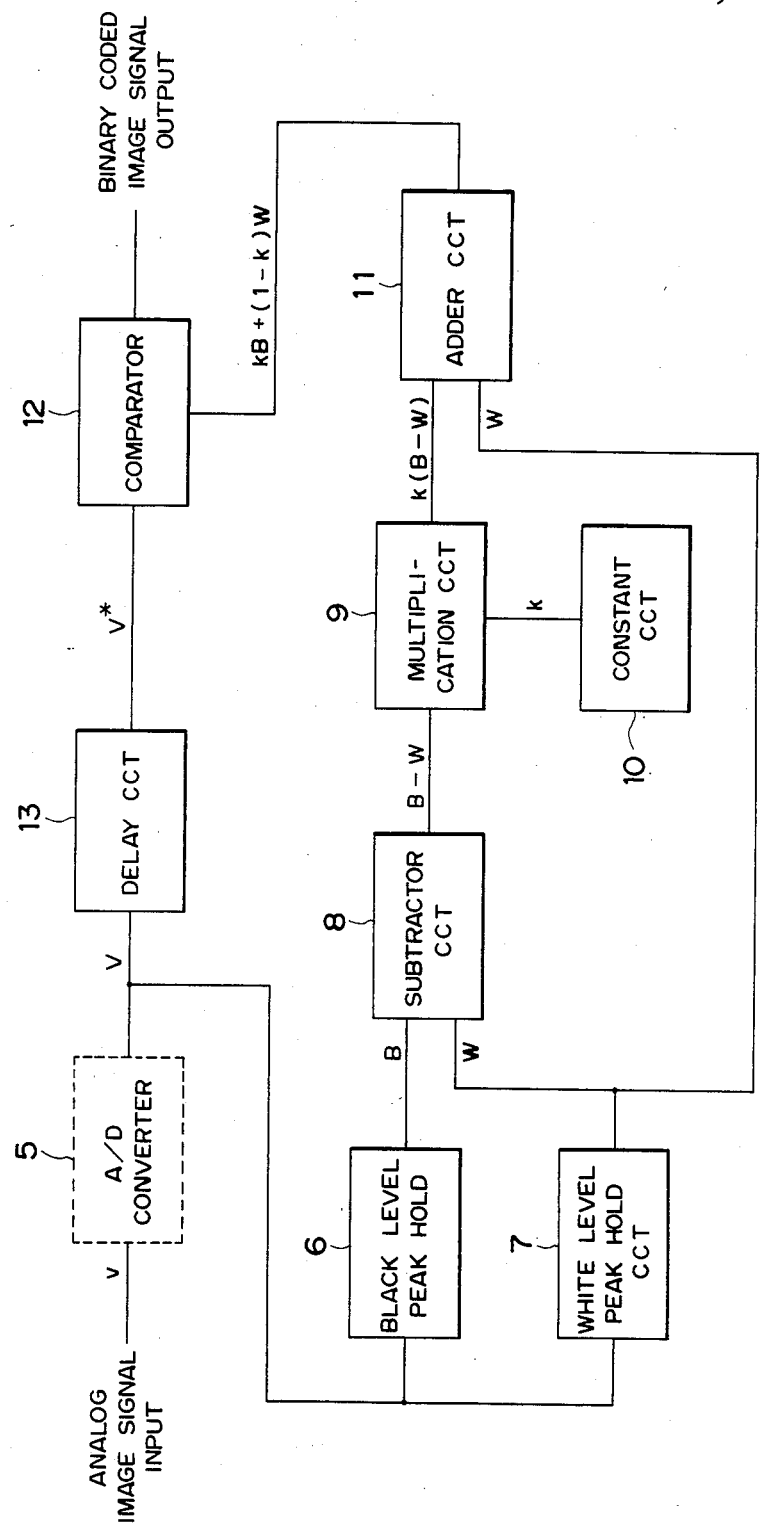
FIG. 2 is a block diagram showing an image signal processing device embodying the present invention.

FIG. 2 shows, in a block diagram, an image signal processing device embodying the present invention, wherein shown is an analog-to-digital (A/D) converter 5. The circuit of the present embodiment to be explained in the following may be realized either in analog form or in digital form, and said A/D converter 5 is needed in case the subsequent circuit is designed with digital form but may be dispensed with in case the subsequent circuit is designed in analog form. In the following description it is assumed that the circuit shown in FIG. 2 is entirely composed of digital circuit components.

Analog image signal v supplied from an image reading device or the like is converted, for each picture element or pixel, into a multi-level digital image signal V by the A/D converter 5, and the peak value B of the black level is sampled and retained by a black-level peak-hold circuit 6. On the other hand a white-level peak-hold circuit 7 samples and retains the peak value W of the white level in the digital image signals V. These sample signals B and W are supplied to a subtracter circuit 8 to obtain a difference signal $B-W$. Than a multiplication circuit 9 multiplies said difference signal $B-W$ by a constant k determined automatically or manually by a constant circuit 10 to obtain an output signal $k(B-W)$. In general said constant k is advantageously selected at a value close to 0.5.

Subsequently an adder 11 adds said output signal $k(B-W)$ and the white level peak value W from the white-level peak-hold circuit 7 to obtain the following slicing level T:

$$T = kB + (1-k)W \tag{1}$$

The above-explained reference signal T enables exact binary digitizing since it is obtained as an average at a ratio:

$$k : (1-k) \qquad (2)$$

of the black-level peak value B and white-level peak value W of the image signals V and is therefore positioned between said black and white peak values. As an example, in case k is selected as 0.5:

$$k : (1-k) = 0.5 : (1-0.5) = 1 : 1 , \qquad (3)$$

so that the slicing level T is positioned exactly at the center between the peak values B and W.

The slicing level signal T and delayed output signals V* obtained by passing the digital image signals V through a delay circuit 13 are then compared in a comparator circuit 12 to obtain binary signals.

Said delay circuit 13 is inserted in order to compensate the delay caused in the black-level peak-hold circuit 6 and the white-level peak-hold circuit 7 with respect to the input image signals, and the delay time is determined in consideration of the amount of the input image signals to be processed by a slicing level T. For example said delay time should at least be equal to the time required for the input of image signals of one line in case a slicing level T is determined for each line, or to the time required for the input of image signals of one page in case a slicing level T is determined for each page, or simply to the time required for peak detection in case the slicing level is determined for each pixel.

The constant k is rendered arbitrarily selectable by the operator, for example by switches on an unrepresented operating console, in order to enable reproduction of an arbitrary density.

It is however possible also to automatically determine the constant k in response to the image information to be read. As an example the constant k may be rendered variable according to the white level peak value so as to shift the slicing level closer to the black level in case the original image has a colored background or closer to the white level in case the original image is written with pencils, thereby ensuring optimum binary digitizing operation.

Figure 3:
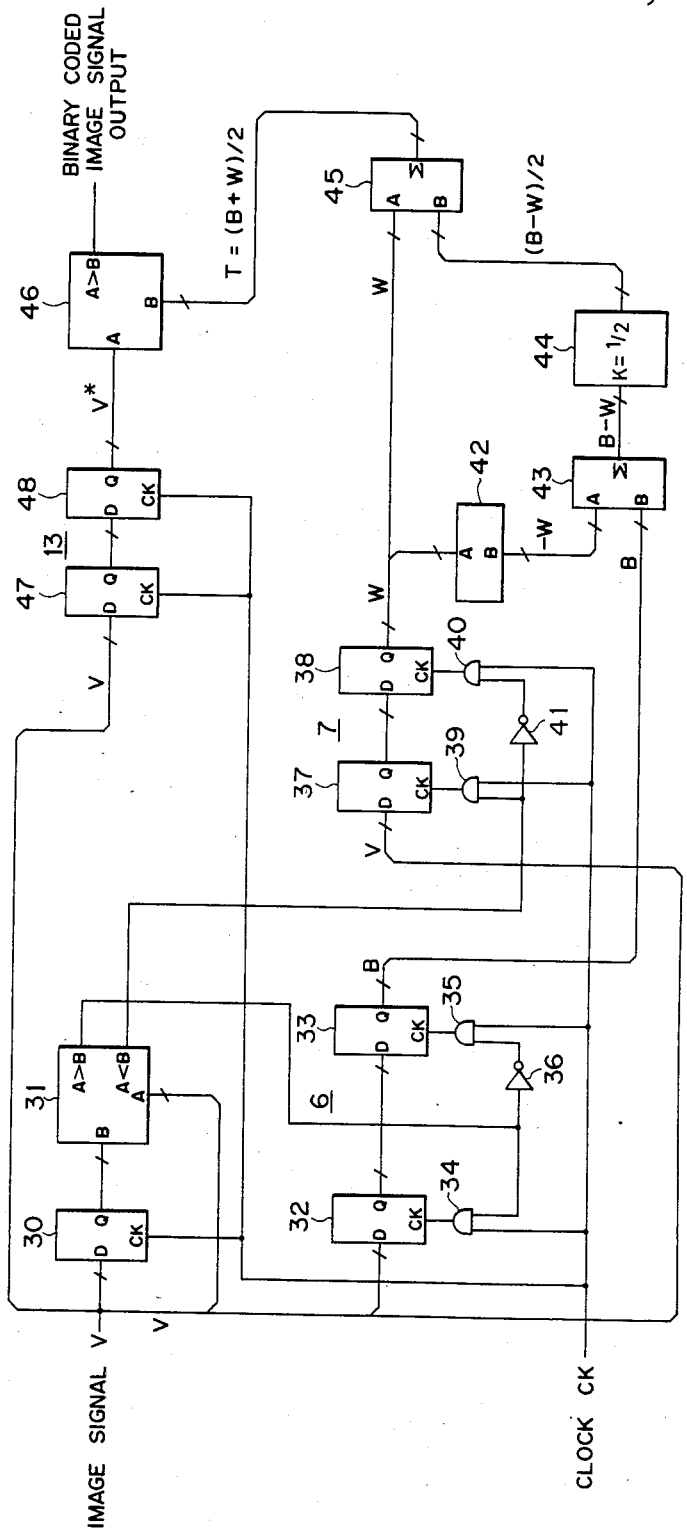
FIG. 3 is a circuit diagram showing the details of the image signal processing device of the present invention.

FIG. 3 shows the detailed circuit structure of the embodiment shown in FIG. 2, wherein the entire circuitry is designed in the digital form and the A/D converter 5 is omitted for the purpose of simplicity.

The digital image signals V are supplied, after a delay of one pixel by a latch 30, to a comparator 31 for detecting the difference of image signals between consecutive two pixels. More specifically the comparator 31 receives the image signals without delay at an input port A and also receives, at an input port B, the image signals delayed by a pixel in the latch 30 to identify, through the comparison of these signals, whether the image signal level is increasing, decreasing or remains at a constant level.

In case the image signal level becomes higher toward the black level with the lapse of time, an output signal A>B of the comparator 31 is shifted to the high level to open an AND gate 34, thereby activating a latch 32 with clock pulses CK and latching the image signal V therein.

In case the image signal level becomes lower toward the white level after passing a black peak, said output signal A>B of the comparator 31 is shifted to the low level to close the AND gate 34, whereby the latch 32 retains the black peak level at this state at an output port Q. Simultaneously the low level output signal A>B is inverted by an inverter 36 and opens an AND gate 35, whereby said black peak level retained in the latch 32 is also retained as an output signal Q of a latch 33.

Then, when the image signal level again starts to increase, the latch 32 starts the latching of a succeeding black peak level. During said increase the latch 33 retains the preceding black peak level B and latches the new black peak level when the image signal level starts to decrease. In this manner, in the present embodiment, the latches 30, 32, 33, comparator 31, AND gates 34, 35 and inverter 36 constitute a black peak-hold circuit 6.

On the other hand the white peak-hold circuit 7 is composed of latches 37, 38, AND gates 39, 40 and an inverter 41 and functions in the same manner as the above-explained black peak-hold circuit 6, except that the AND gates 39, 40 are controlled by another output signal A<B of the comparator 31.

The black peak-hold signal B is directly supplied to an adder 43 while the white peak-hold signal W is supplied thereto through an inverter 42 to obtain a difference signal B−W, which is supplied to a k-multiplication circuit 44. Said circuit 44 should be composed of a multiplier for conducting multiplication of a suitably selected constant k, but, for simplifying the circuit in the present example, the constant k is fixed at $\frac{1}{2}$ and the multiplication of $\frac{1}{2}$ on the signal B−W is achieved in a half-dividing circuit by shifting all the bits of the signal B−W by one bit toward the lowest significant bit. Such fixed selection of the constant k at $\frac{1}{2}$ is convenient for basic binary digitizing as it corresponds to a slicing level positioned exactly at the center of the black and white peak levels.

Then the output signal W from the latch 38 and the output signal (B−W)/2 from the half-dividing circuit 44 are supplied to an adder 45 to calculate W+(B−W)/2 =(B+W)/2, which is supplied as the slicing level T to an input port B of a comparator 46. The comparator 46 receives, at an input port A, the digital image signals V* delayed by two pixels through latches 47, 48, whereby said digital image signals V* are converted into binary image signals by slicing with said slicing level T.

In the present embodiment there are provided two latches 47, 48, but the number of said latches is not necessarily limited to two but should preferably be selected within a range from zero to five in consideration of the slope of density change or the through rate of the image signals. More specifically the number of said latches should be selected as $a^{m-s}+1$ for a number m of bits of digitizing of the image signal V and for a maximum through rate S bits/pel, and this reflects a concept that the real slicing level T is reached in response to the detection of a white or black peak value following said image signal V. In the approximation, however, the expected performance can be achieved even without the use of such latches.

The delay time of the image signals should be determined according to the corresponding slicing level in the aforementioned manner. For example the image signals of a line are to be binary digitized by a slicing level obtained from the image signals of a preceding line, said delay time should be equal to the time required for the entry of a line.

In the embodiment shown in FIG. 2, the illustrated circuit structure is employed in order to exactly perform the calculation corresponding to the equation (1), but other circuit structures are naturally employable as along as the same result can be attained.

Figure 4:
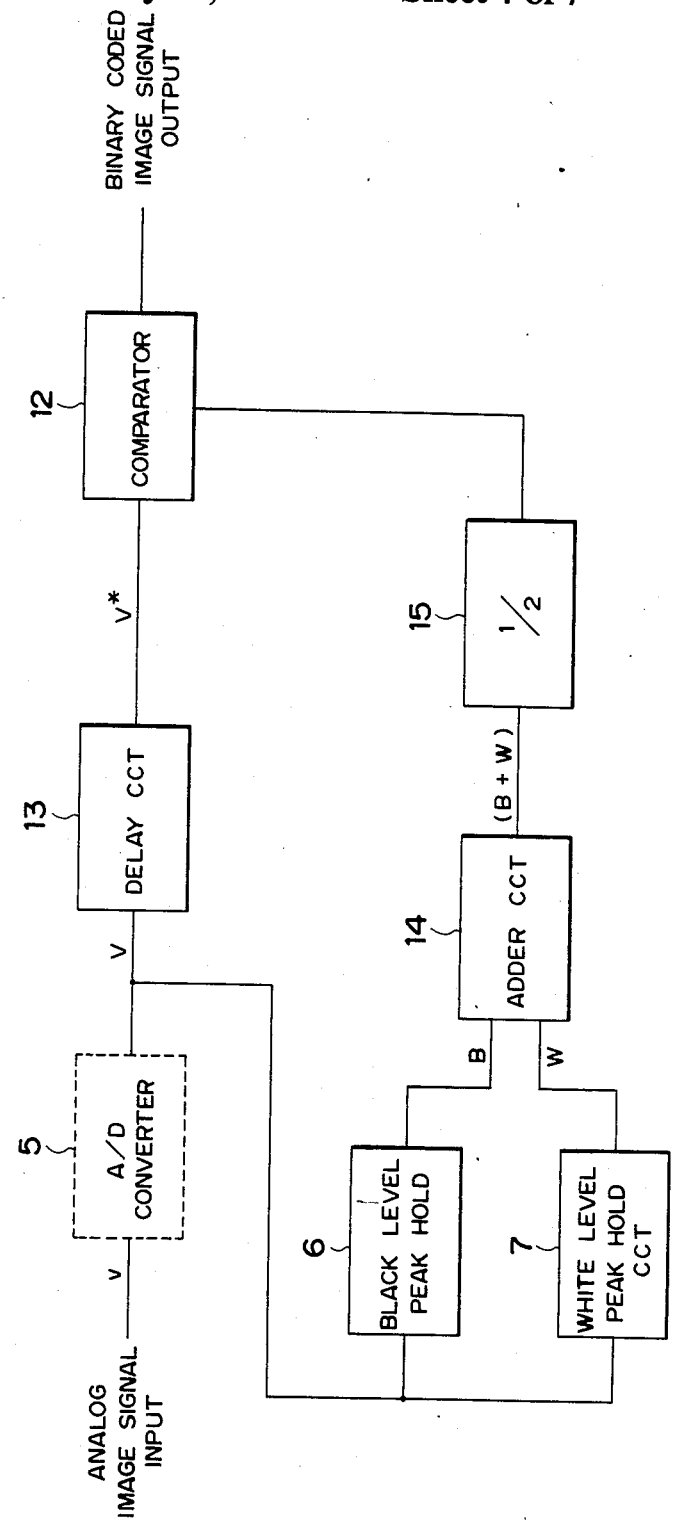
FIG. 4 is a block diagram showing a second embodiment of the image signal processing device of the present invention.

As an example, for a constant $k=\frac{1}{2}$, a circuit structure shown in FIG. 4 may be employed since the obtained slicing level in this case is equivalent to the average of the levels B and W. In FIG. 4 an adder 14 adds the output signals B, W from the peak-hold circuits 6, 7 to obtain an addition output signal (B+W), which is supplied to a $\frac{1}{2}$-multiplication circuit 15 for multiplying $\frac{1}{2}$ by the bit shift operation explained in the foregoing to obtain an output signal (B+W)/2. In FIG. 4, same components as those shown in FIG. 2 are represented by same numbers and are not explained again.

Figure 5:
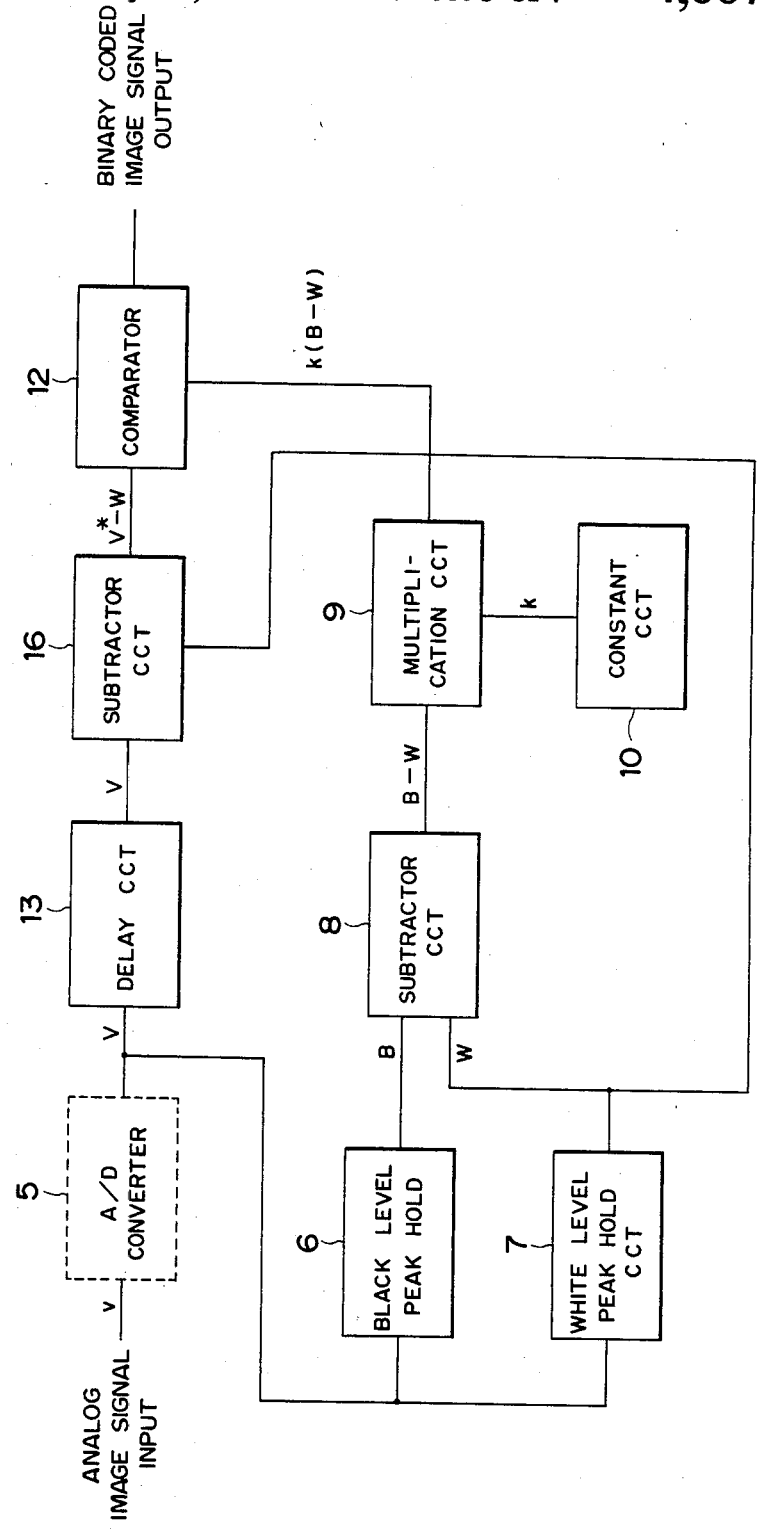
FIG. 5 is a block diagram showing a third embodiment of the image signal processing device of the present invention.

Also in the embodiment shown in FIG. 2, the adder circuit 11 may be replaced by a subtracting circuit 16 shown in FIG. 5, which receives the output signal V* from the delay circuit 13 and the output signal W from the white level peak-hold circuit 7 to obtain a difference signal V*−W for comparison with the output signal k(B−W) from the multiplication circuit 9. Such circuit structure allows to reduce the number of bits of the comparator 12. Also in FIG. 5, same components as those shown in FIG. 2 are represented by same number and are omitted from the explanation.

Figure 6A:
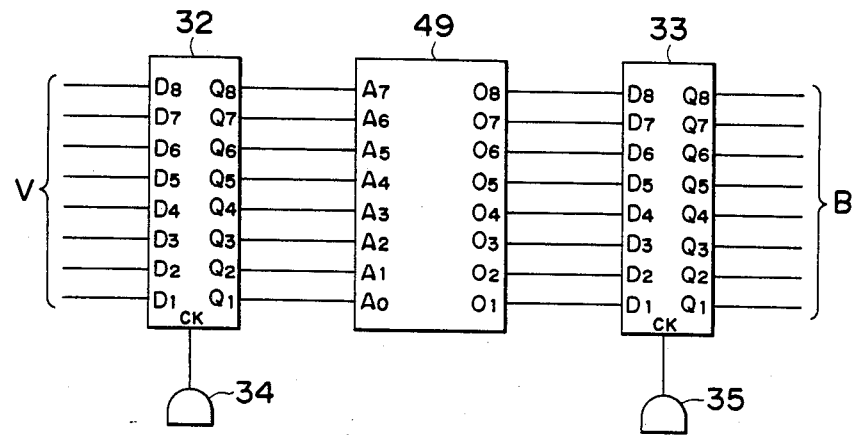
FIG. 6A is a block diagram showing an example of a non-linear data converting device.
Figure 6B:
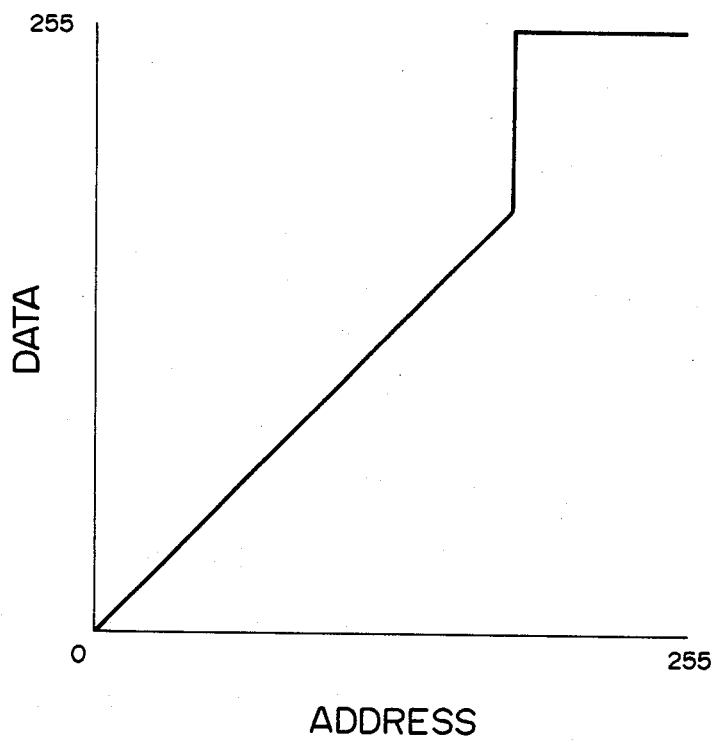
FIG. 6B is a schematic view showing ROM data thereof.

The binary digitizing circuit of the present invention shown in FIG. 3 may be further provided with a correction circuit such as a limiter in order to avoid binary digitizing of the peak values resulting from noises in a black or white continuous area. Such correction can be achieved, for example, by a read-only memory storing a non-linear function inserted between the latches 32 and 33. As an example, it is possible to disregard the noises in the black continuous area by inserting, as shown in FIG. 6A, a data correction unit utilizing a read-only memory 49 storing data shown in FIG. 6B and by supplying correction data from said read-only memory 49 to the latch 33 in response to the output signals from the latch 32.

A similar limiter may be provided also in the white level peak-hold circuit.

The binary digitizing circuit for image signals shown in FIG. 2 can also be realized in analog circuitry. For example the delay circuit 13 shown in FIG. 2 may be composed of a delay line in the analog circuitry instead of the shift register in the digital circuitry. Also the comparator 12 can be composed of an analog comparator. The adder circuit 11 can be simply composed of a resistance adder in the analog circuitry, and the multiplication circuit 9 can be composed of an analog multiplier, for example MC1494L supplied by Motorola. Also the subtracting circuit 8 can be composed of a resistance adder circuit including a phase inverting circuit.

Figure 7:
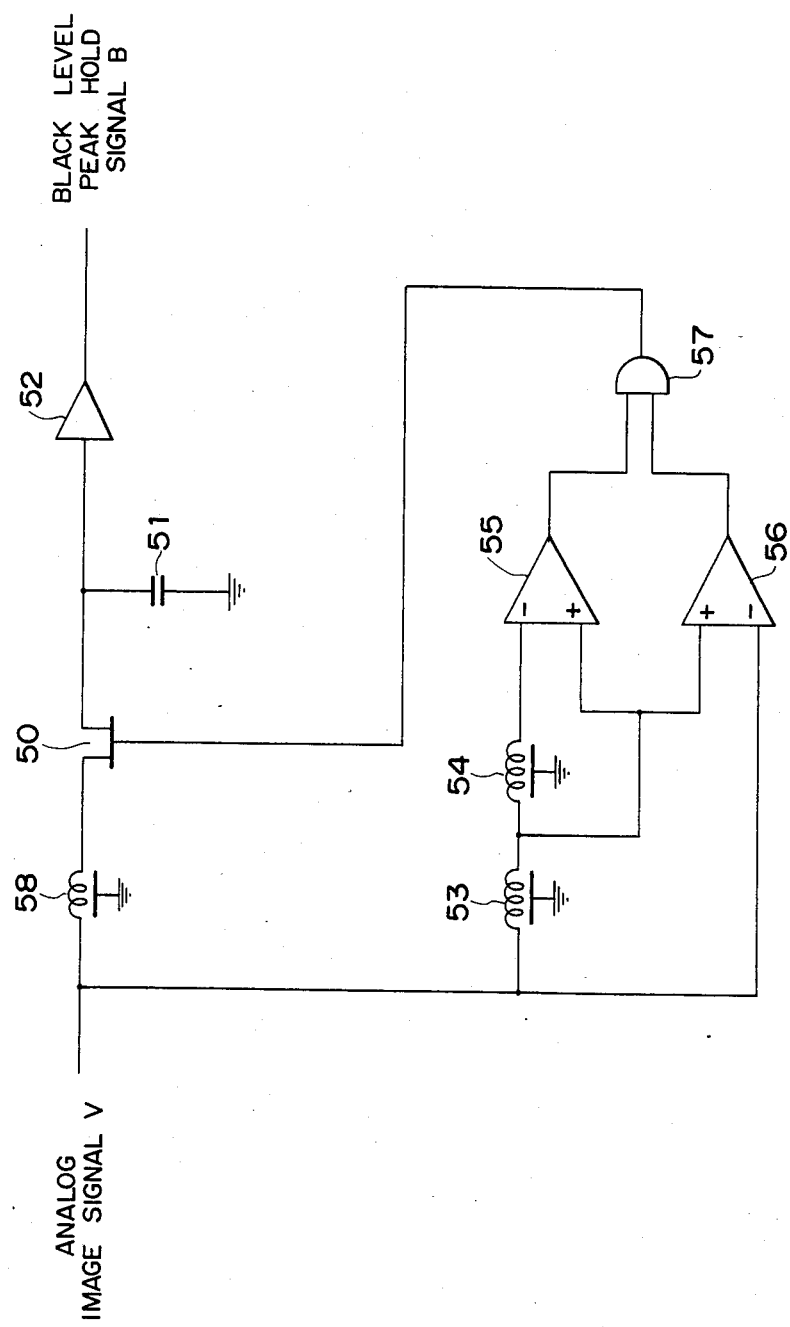
FIG. 7 is a circuit diagram showing an embodiment of an analog black-level peak-hold circuit.

The black level peak-hold circuit 6 and the white-level peak-hold circuit 7 can also be formed with analog components as shown in FIG. 7. In the following the black level peak-hold circuit alone will be explained since these circuits are substantially alike.

In FIG. 7 there are shown an FET switch 50, a condenser 51, a buffer amplifier 52, delay lines 53, 54, comparators 55, 56, an AND gate 57 and another delay line 58.

The analog image signals V are delayed by a time corresponding to a pixel respectively in the delay lines 53, 54 and are supplied respectively to the comparators 55, 56. If V(t) represents the value of the input image signal at a time t, the output signals of the delay lines 53, 54 are given by $V(t-\tau)$, $V(t-2\tau)$ wherein $\tau$ is the delay time in each delay line. The comparator 55 releases a high-level output signal in case $V(t-\tau)>T(t-2\tau)$ while the comparator 56 releases a high-level output signal in case $V(t)<V(t-\tau)$, so that the AND gate 57 releases a high-level output signal under a condition:

$$V(t)<V(t-\tau)>V(t-2\tau) \qquad (4)$$

Under such condition the FET switch 50 is turned on to accumulate the analog image signal $V(t-\tau)$ in the condenser 51. The above-explained relation (4) defines a maximum value, and the FET switch 50 is turned off when the image signal no longer satisfies the relation (4). In this manner the black level peak value is retained in the condenser 51. The charge accumulated in the condenser 51 is transmitted, as the black level peak-hold signal B, to the succeeding step through the buffer amplifier 52. The delay line 58 is inserted for exactly sampling the signal $V(t-\tau)$ when it reaches the maximum.

As explained in the foregoing, the present invention allows exact binary digitizing of image signals representing small characters, characters on a colored background, low-density characters such as those written with pencils or white characters on colored background since an intermediate level between the black and white peak values of the varying image signals as the slicing level for binary encoding. Also the use of digital processing ensures stable binary digitizing operation since the absence of the charge-discharge circuit for condenser eliminates the possibility of time-dependent change of the slicing level. Also the binary digitizing circuit composed solely of digital components is suitable for formation as an integrated circuit, thus allowing compactization and cost reduction of the device.

Also suitable correcting means can avoid erroneous level setting caused by noises contained in the continuous white or black area in the image signals.

Furthermore, instead of determining the slicing level for binary digitizing for the image signals from the white and black peak values, it is possible to select, in response to said peak values, a dither pattern for reproducing an intermediate tone including plural slicing levels, and to effect the binary encoding of the image signals by means of the slicing levels of thus selected dither pattern.

What I claim is:

1. An image signal processing device comprising:
   means for entering digital image signals each representing an image density level of a pixel;
   means for detecting peak values of black and white levels in the digital image signals entered by said entering means;
   means for forming a digital reference signal based on differences between the detected peak values of the black level and the detected peak values of the white level;
   means for obtaining differences between the digital image signals entered by said entering means and the black or the white peak values detected by said detecting means and for generating a digital difference signal representative of the obtained differences; and
   means for comparing the digital difference signal generated by said generating means and the digital reference signal formed by said forming means with each other to produce binary coded image signals.

2. An image signal processing device according to claim 1, wherein said forming means forms the digital reference signal by means of multiplying the differences between the detected peak values of the black and white levels by a constant.

3. An image signal processing device according to claim 2, further comprising means for determining said constant relative to an image processing process.

4. An image signal processing device according to claim 3, wherein said determining means is adapted to determine said constant in response to the digital image signals entered by said entering means.

5. An image signal processing device according to claim 1, further comprising means for delaying the digital image signals entered by said entering means.

6. An image signal processing device according to claim 5, wherein said delaying means corresponding to a delay in the forming of the digital reference signal by said forming means.

7. An image signal processing device according to claim 1, wherein said detecting means has means for comparing the image density levels of successive ones of digital image signals with each other, and means for latching selected ones of the digital image signals in response to the result of said comparison by said comparing means.

8. An image signal processing device according to claim 7, wherein said comparing means comprises means for storing a predetermined number of said successive ones of the digital image signals.

9. An image signal processing device according to claim 7, wherein said selected ones of the digital image signals represent the black and the white peak values in the digital image signals.

10. An image signal processing device comprising:
means for entering digital image signals each representing an image density level of a pixel;
memory means containing data to be used in converting digital image signals which are above or below respective predetermined levels into respective given values;
means for detecting peak values in the digital image signals entered by said entering means;
means including said memory means for performing a correcting operation, based on the data contained in said memory means, so as to convert those of said peak values detected by said detecting means which are above or below said respective predetermined levels into said respective given values to produce corrected peak values; and
means for processing the digital image signals entered from said entering means based on the corrected peak values
wherein said processing means is adapted to convert the digital image signals entered by said entering means into binary signals.

11. An image signal processing device according to claim 10, wherein said processing means further comprises means for forming a digital reference signal for the conversion of the digital image signals into the binary signals based on the corrected peak values.

12. An image signal processing device according to claim 10, wherein said detecting means has means for comparing the image density levels of successive ones of the digital image signals entered by said entering means with each other, and means for latching selected ones of the successive ones of the digital image signals in response to the result of said comparison by said comparing means.

13. An image signal processing device according to claim 12, wherein said compairng means comprises means for storing a predetermined number of said successive ones of the digital image signals.

14. An image signal processing device according to claim 12, wherein said selected ones of the digital image signals represent black and white peak values in the digital image signals.

* * * * *